UNITED STATES PATENT OFFICE 2,413,134

PROCESS FOR THE MANUFACTURE OF CRYSTALLINE ABSORBENTS

Richard Maling Barrer, Bingley, England

No Drawing. Application August 22, 1944, Serial No. 550,680. In Great Britain September 22, 1943

3 Claims. (Cl. 23—110)

This invention relates to the manufacture of crystalline absorbents useful, among other purposes, for effecting the separation of various liquid hydrocarbons that are characterized by pronounced differences in their stereometric structure and the size and shape of the molecule, such as for example the straight chain and the branched chain aliphatic hydrocarbons. Because of the capability of such crystalline absorbents to effect separations of various hydrocarbons based on their differences in molecular size and shape, the effect of the crystalline absorbents may be likened to the separating effect displayed by sieves and they have come to be spoken of as "molecular sieve absorbents."

In my United States Patent No. 2,306,610 I have described the separation of straight chain hydrocarbons from mixtures containing straight chain hydrocarbons and branched chain and/or cyclic hydrocarbons using certain dehydrated zeolites as molecular sieve absorbents. The said patent also describes the separation in a similar manner of methane, ethylene and ethane from hydrocarbons containing three or more carbon atoms in the molecule. The zeolite which it is preferred to use in the process of Patent No. 2,306,610 is chabasite.

Of suitable zeolites, however, large natural deposits are scarce or lacking, and it is an object of the present invention to provide processes for the manufacture of synthetic molecular sieve absorbents capable of effecting the separations described in Patent No. 2,306,610.

Of naturally occurring zeolites only very few, such as mordenite, occur as large deposits. Analcite may be made synthetically, as is already known, in a number of ways. A quick and convenient method capable of yielding any desired quantity of the mineral consists in crystallising gel mixtures having the composition $$NaAlSi_2O_6 \cdot n.H_2O$$

or approximately that composition. These gels are easily made by mixing $NaOH.Al(OH)_3$ and $Si(OH)_4$; or by stirring together waterglass and sodius aluminate solutions. The reaction mixture is crystallised in suspension in water at about 200° C. for a period of approximately 24 hours, when analcite crystals separate. It is no disadvantage to crystallise from an alkaline medium. The synthesis of analcite, however, is not part of the present invention.

Another source of analcite is leucite, of which there are some large natural deposits. This mineral is readily converted to analcite by base-exchange of potassium ion with sodium ion with aqueous solutions of sodium salts such as the carbonate, at about 200° C. Leucite is indicated as a valuable source of potassium salts (Chem. Zentralblatt, 1941, 2, 2240-1; also Green and McCarthy, Ind. Eng. Chem., 1944, 36, 412), but in cases where base-exchange is used to obtain potassium the analcite is not a useful by-product.

I have discovered according to the present invention that a hydrothermal method using concentrated aqueous barium salt solutions may be employed to make crystalline molecular sieve absorbents. For example, a new mineral differing from any hitherto synthetically prepared zeolite and having sorptive properties similar to those of chabasite can be prepared from analcite or leucite, or from various aluminosilicate gels, by treatment at high temperatures with concentrated solutions of barium chloride or bromide. The analcite or leucite may be synthetically prepared, for example, as hereinbefore described in the case of analcite, or the naturally occurring mineral may be used.

Accordingly, the present invention provides a process for the manufacture of crystalline sieve absorbents by the hydrothermal alteration of the aluminosilicates analcite and leucite and of aluminosilicate gels containing mainly alkali metal or alkaline earth metal cations but being otherwise substantially of analcite composition, which comprises heating the said aluminosilicates to an elevated temperature with an excess of a concentrated aqueous solution of barium chloride or barium bromide, extracting the products with water to remove entrained or occluded salts and dehydrating the extracted product by heating.

The aluminosilicate gels may be conveniently prepared from waterglass and sodium aluminate or from $NaOH.Al(OH)_3.Si(OH)_4$ mixtures as hereinbefore indicated. They may also be synthetic gel zeolites such for example as that sold under the trade name "Burgess Freeze-Formed Zeolite." The cations in the gel are mainly group IA or IIA cations such as $Na^+$, $K^+$, $Ba^{++}$, $Ca^{++}$, but I prefer to use a gel in which the cation is $Ba^{++}$. The cations are readily replaced by base-exchange in these gels or gel zeolites. I prefer to use gels having the composition $M^+AlSi_2O_6 x H_2O$, or $M^{++}Al_2Si_4O_{12} x H_2O$ or mixtures of the two, where $M^+$ and $M^{++}$ denote respectively alkali metal cations and alkaline earth metal cations, e. g. $Na^+$, $K^+$, $Ca^{++}$ and $Ba^{++}$. I have also found, however, that good yields of the new mineral can be obtained from gels not of this composition, for example when the initial gel was "Burgess Freeze-Formed Zeolite," or a Ca - base - exchanged "Doucil." I may therefore use gels which depart somewhat from the above composition.

As stated hereinbefore the initial gel or mineral is converted into the new mineral by heating it with a concentrated aqueous solution of barium chloride or barium bromide, but preferably barium chloride. The barium is present in excess over any other cations, and I prefer that the solution of barium salt should be saturated or very concentrated. In typical preparations the mineral or gel was powdered and well mixed with from one-half to one-and-a-half times its volume of solid barium chloride or bromide, and water was added amounting to from one-half to one times the volume of total solid. The mixtures were then heated in autoclaves at temperatures from 180° to 270° C. and for periods ranging from two to six days. I may, however, choose reaction conditions outside these ranges of composition, temperature and time. The mixture crystallised under the conditions described to give characteristic small crystals. Freshly prepared gels crystallised most easily and the best formations of crystals were obtained in the temperature range of from 180° to 220° C.

The mineral thus prepared contained a great deal of occluded barium chloride or bromide. This salt had to be removed to leave the active mineral, and this can be effected by heating the mineral to high temperatures with water. Typical extractions were performed in the temperature range of from 180 to 270° C., in an autoclave but I may also choose temperatures outside this range. In these typical experiments with a mineral to water ratio of from 1:6 to 1:15, some ten extractions were given of 24 hours or more. The total time required for extraction may be reduced by decreasing the mineral to water ratio. I may also carry out the extraction by a continuous process.

During extractions of the occluded salt there may be some secondary change of the mineral, and I prefer to make the mineral using barium chloride rather than barium bromide, since secondary change was then less marked.

The active crystalline product obtained after extraction of the occluded salt was, when dehydrated, an excellent molecular sieve absorbent, having sorptive properties similar to those of chabasite. Thus, at room temperature, it occludes hydrocarbons having one and two carbon atoms in the molecule rapidly, higher normal hydrocarbons slowly, and excludes iso-paraffins. The actual consumption of barium salt in making the mineral was slight, for the barium salt used in crystallising, or occluded, was readily recovered.

The details of some typical preparations are given below in Table I:

TABLE I

| No. | Raw mineral | Treatment | Temperature °C. | Product |
|---|---|---|---|---|
| 1 | Barium aluminosilicate gel, $BaAl_2Si_4O_{12}.xH_2O$. | Three days' heating with concentrated aqueous $BaCl_2$ | 235 | Good yield of mineral, with occluded $BaCl_2$. |
| 2 | Barium aluminosilicate gel as above. | do | 270 | Moderate yield only of mineral. Occluded $BaCl_2$. |
| 3 | Synthetic analcite $NaAlSi_2O_6.H_2O$. | Six progressive treatments with concentrated aqueous $BaCl_2$, each lasting about one day. | 210 | Excellent yield of mineral. Occluded $BaCl_2$. |
| 4 | Naturally occurring analcite, $NaAlSi_2O_6.H_2O$. | Five progressive treatments with concentrated aqueous $BaCl_2$, each lasting 12 hours. Analcite mixed with half its volume $BaCl_2$ and with half the total apparent solid volume of water. | 200 | Do. |
| 5 | Naturally occurring analcite as in 4. | Four progressive treatments with concentrated aqueous $BaCl_2$, each lasting about 1 day. | 233 | Good to moderate yield of mineral. Occluded $BaCl_2$. |
| 6 | Potassium aluminosilicate gel, $KAlSi_2O_6.xH_2O$. | Six days' heating with concentrated aqueous $BaCl_2$. | 180 | Excellent yield of mineral. Occluded $BaCl_2$. |
| 7 | Ca-base-exchanged gel zeolite—"Doucil." | (a) Six days' heating with concentrated aqueous $BaCl_2$. | 180 | Crystallisation not marked. |
|  |  | (b) Five days' heating with concentrated aqueous $BaCl_2$. | 208 | Excellent yield of mineral. Occluded $BaCl_2$. |
| 8 | Gel zeolite—"Burgess Freeze-Formed Zeolite." | Five days' heating with concentrated aqueous $BaCl_2$. | 208 | Good yield of mineral. Occluded $BaCl_2$. |
| 9 | Barium aluminosilicate gel, $BaAl_2Si_4O_{12}.xH_2O$. | One day's heating with concentrated aqueous $BaCl_2$ at 210° C. followed by two days' further heating at 197° C. |  | Do. |
| 10 | Synthetic analcite, $NaAlSi_2O_6.H_2O$. | Two days' heating with concentrated aqueous $BaBr_2$. | 204 | Good yield of mineral. Occluded $BaBr_2$. |

Typical extraction processes are summarized in Table II.

TABLE II

*Extraction of $BaCl_2$ from the mineral*

| Product | Mineral to water volume ratio, about— | No. of extractions | Temperature and duration of each extraction |
|---|---|---|---|
| No. 1, Table I | 1:15 | 10 | 24 hours at 210° C. |
| No. 3, Table I | 1:15 | 10 | Do. |
| No. 4, Table I | 1:6 | 10 | About two days at temperatures 200–270° C. |
| No. 5, Table I | 1:15 | 6 | About two days at nearly 270° C. |
| No. 9, Table I | 1:15 | 7 | About one-and-a-half days at 208° C. |

In prolonged use, involving heating in organic vapours, powdered zeolites, including those manufactured according to the process of this invention may become coated with a layer of carbon, which eventually may impair the occlusive power. I have found that such minerals may be reactivated by passing a stream of air or oxygen through the powdered mass maintained at suitable temperatures. In a typical experiment oxygen was passed through a sooted chabasite powder for two hours at 300° C., when it was quite freed of carbon. A similar experiment using an air stream at 300° C. required 16 hours to remove the carbon. By using a dry air or oxygen stream, I have simultaneously reactivated and dehydrated these minerals. In dehydration and reactivation of the minerals I prefer to use the temperature range of from 300 to 460° C. The temperature and/or duration of heating must not be sufficiently high to cause collapse of, or alter irrevocably, the crystal lattice of the mineral.

I claim:

1. A process for the manufacture of crystalline absorbents by hydrothermal alteration of aluminosilicates which comprises heating an aluminosilicate selected from the group consisting of analcite, leucite and aluminosilicate gels whose cations are mainly at least one cation selected from the group consisting of alkali metal cations and alkaline earth metal cations and which are otherwise substantially of analcite composition with an excess of a concentrated aqueous solution of a barium salt selected from the group consisting of barium chloride and barium bromide in a closed reaction zone at a temperature of between 180° C. and 270° C. for a period of between two and six days, extracting the product thus formed with water to remove occluded salts and dehydrating the extracted product by heating.

2. A process for the manufacture of crystalline absorbents by hydrothermal alteration of aluminosilicates which comprises heating an aluminosilicate selected from the group consisting of analcite, leucite and aluminosilicate gels whose cations are mainly at least one cation selected from the group consisting of alkali metal cations and alkaline earth metal cations and which are otherwise substantially of analcite composition with an excess of a concentrated aqueous solution of a barium salt selected from the group consisting of barium chloride and barium bromide, extracting the product thus formed with water in a closed reaction zone at a temperature of between 180° C. and 270° C. to remove occluded salts and dehydrating the extracted product by heating.

3. A process for the manufacture of crystalline absorbents by hydrothermal alteration of aluminosilicates which comprises heating an aluminosilicate selected from the group consisting of analcite, leucite and aluminosilicate gels containing mainly barium cations but being otherwise substantially of analcite composition with a concentrated aqueous solution of a barium salt selected from the group consisting of barium chloride and barium bromide in a closed reaction zone at a temperature of between 180° C. and 270° C. for a period of between two and six days, extracting the product thus formed with water in a closed reaction zone at a temperature of between 180° C. and 270° C. to remove occluded salts, and dehydrating the extracted product by heating.

RICHARD MALING BARRER.